United States Patent

Cook

[11] 4,235,121
[45] Nov. 25, 1980

[54] CHAIN SPEED REDUCER ASSEMBLY

[75] Inventor: Greg Cook, Duncan, Okla.

[73] Assignee: Cook Machine Company, Duncan, Okla.

[21] Appl. No.: 955,106

[22] Filed: Oct. 26, 1978

Related U.S. Application Data

[63] Continuation-in-part of Ser. No. 840,969, Oct. 11, 1977, abandoned.

[51] Int. Cl.³ .............................................. F16H 7/14
[52] U.S. Cl. ...................................... 474/89; 403/16; 474/112
[58] Field of Search ........ 74/242.16, 242.12, 242.14 R; 403/16

[56] References Cited

U.S. PATENT DOCUMENTS

| | | | |
|---|---|---|---|
| 1,065,069 | 6/1913 | Noble | 403/16 |
| 1,171,347 | 2/1916 | Morse | 74/242.16 |
| 1,218,686 | 3/1917 | Morse | 74/242.16 |
| 1,416,578 | 5/1922 | Sauers | 403/16 |
| 2,245,925 | 6/1941 | Klancke | 74/242.16 |
| 2,492,219 | 12/1949 | Haefeli | 74/242.8 |
| 2,675,709 | 4/1954 | Dowdy | 74/242.16 |
| 2,691,553 | 10/1954 | Pettigrew | 74/242.16 |
| 2,893,255 | 7/1959 | Bayliss | 74/242.8 |
| 3,036,120 | 2/1967 | Kratzsch | 308/62 |
| 3,226,995 | 1/1966 | Getz et al. | 74/242.8 |
| 3,399,582 | 9/1968 | Henry | 74/242.16 |
| 3,733,919 | 5/1973 | Rupp | 74/242.16 |

FOREIGN PATENT DOCUMENTS 542378 4/1956 Italy ...................................... 74/242.16

Primary Examiner—C. J. Husar
Assistant Examiner—Conrad Berman
Attorney, Agent, or Firm—Dunlap, Codding & McCarthy

[57] ABSTRACT

An improved chain speed reducer assembly comprising a drive shaft supported at one end by a first bearing block and by a second bearing block at the other end. Each of the bearing blocks has a shaft supporting bore that is axially displaced a predetermined offset distance from the central axis of the bearing block, and each of the bearing blocks is supported by a gear box frame so as to be selectively rotatable about the central axis of each bearing block. Attaching bolt connectors permit the bearing blocks to be secured at selected angular dispositions. This permits selective canting of the drive shaft, and when coupled with other similarly supported driven shafts supporting plural sprockets, separate strands of roller chains can be adjusted independently via the eccentric movement of the bearing block supporting bores upon selective rotation of the bearing blocks.

10 Claims, 6 Drawing Figures

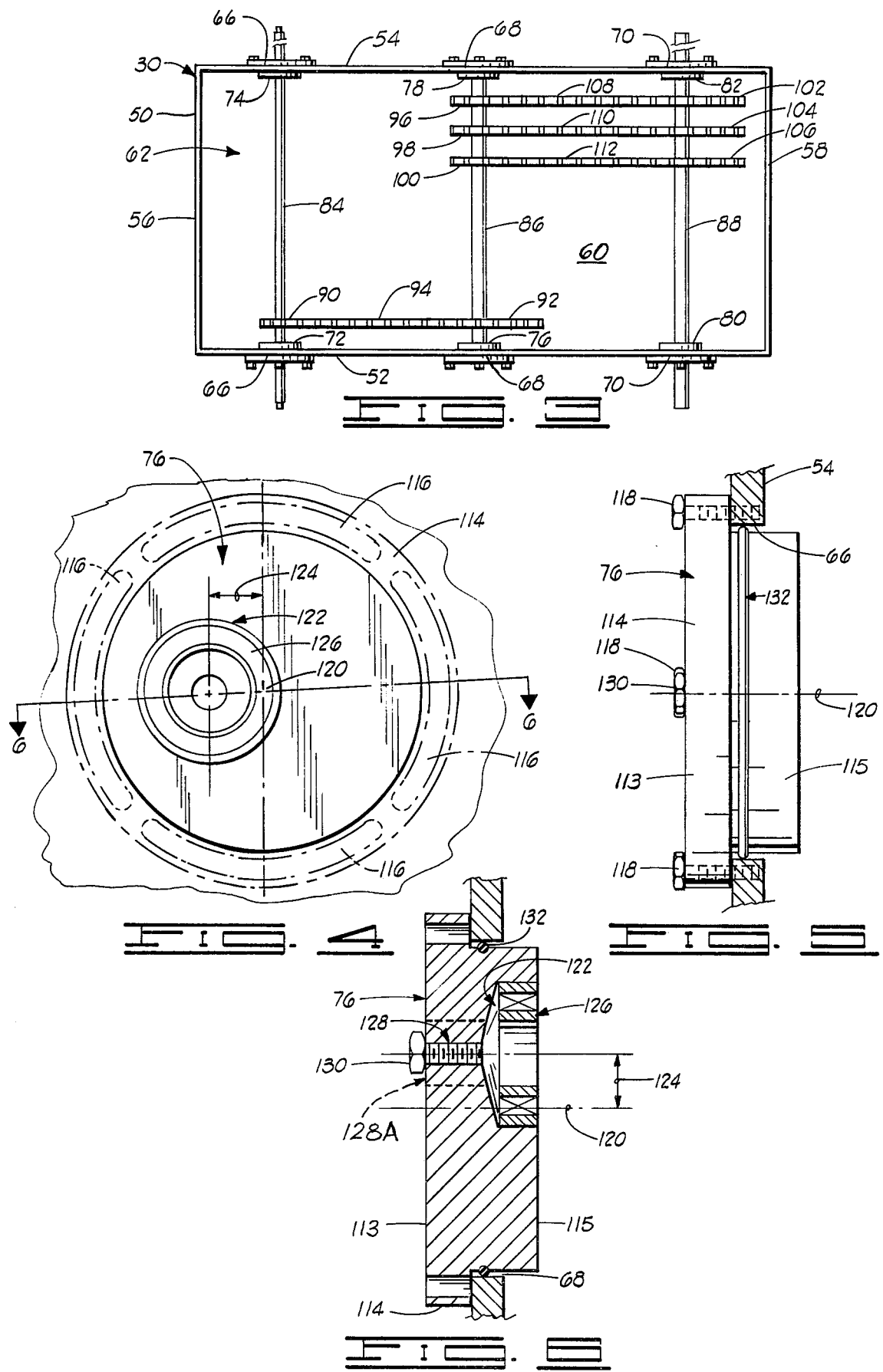

4,235,121

CHAIN SPEED REDUCER ASSEMBLY

Cross Reference to Related Applications

The present application is a continuation-in-part to U.S. Patent Application Ser. No. 840,969, entitled "CHAIN SPEED-REDUCER FOR OIL PRODUCTION PUMPING UNIT", filed Oct. 11, 1977, and now abandoned.

BACKGROUND OF INVENTION

1. Field of Invention

The present invention relates to gear reducing devices, and more particularly but not by way of limitation, to improved speed reducing assemblies of the type used to power oil production pumping units.

2. Prior Art

In the production of oil utilizing downhole pumps, it is common to utilize a surface apparatus having a reciprocating walking beam, one end of which being referred to as a horse's head. Attached to the horse's head is one end of a rod strand that extends down through an oil well tubing, the other end of the rod strand being attached to a reciprocating action downhole fluid pump. As the walking beam is oscillated about its supporting pivot post, the horse's head causes the rod strand to move alternately upward and then downward, stroking the downhole pump and lifting fluid up the tubing.

A walking beam of the type described is usually powered by an internal combustion engine or by an electric motor, each of which generate power at relatively high rotational speeds. It is common to couple the power input of such plants to a speed reducer which in turn is connected to apparatus that cause the walking beam to oscillate at a much reduced rate. For example, an electric motor output of 1750 r.p.m. might power a walking beam that is operating at 20 strokes per minute.

The amount of power that must be transmitted to the walking beam of a pumping unit has in the past usually required multiple strands of belts or chains in order to transmit the required pumping horsepower, since standard belts or chains are rated at increments of the required power, and by the use of multiple strands, more precise and economical matching of power transmission requirements can be achieved.

There are problems with using multiple strands of belts or chains, as the individual strands tend to relax and stretch at independent rates. It is difficult to continuously keep such strands evenly tensioned so that all of the strands share the power transmission. In the past, the use of multiple strands or webs of chains proved very impractical, as it seemed a near impossible task to determine whether the strands or web were evenly tensioned, and as wear set in, the uneven tensioning condition caused severe wear to increase at near geometric age progression. This almost altogether discouraged the use of chains in speed reducers for oil well pumping units, and as a consequence, most such pumping units were constructed to have sheaves and fiber belts. While fiber belts introduced considerable stretch, this could be offset somewhat by mounting the bearing blocks supporting the drive shafts on tracks so that the supporting shaft could be canted to provide means to obtain even tensioning of the individual belt strands. However, such belts required continuous attention to tension adjustment, and the belts had sheave slippage not encountered in the positive dripping afforded by the use of chains and sprockets.

SUMMARY OF THE INVENTION

A principal object of the present invention is to provide an improved chain speed reducer assembly in which separate strands of roller chains can be adjusted independently so as to assure even tensioning in all such strands.

Another object of the present invention, while achieving the above stated object, is to provide a chain speed reducer assembly which eliminates the possibility of misalignment of a drive sprocket with its respective driver sprocket.

Yet another object of the present invention, while achieving the above stated objects, is to provide a chain speed reducer which permits a plurality of single strand chains to be adjusted to the correct tension on the same shaft.

A further object of the present invention, while achieving the above stated objects, is to provide a chain speed reducer assembly which enables the inspection of each strand of chain for proper tension adjustment.

Still another object of the present invention, while achieving the above stated objects, is to provide a chain speed reducer assembly which is simple in design, inexpensive to manufacture, rugged in construction, easy to install and efficient in operation.

Other objects, features and advantages of the present invention will become clear when the following specification is read in conjunction with the accompanying drawings and claims.

BRIEF DESCRIPTION OF THE DRAWINGS

FIG. 3 is a top plan view of the speed reducer assembly of FIG. 2 with the top panel removed.

FIG. 4 is a view of a bearing block as seen from the inside of a chain reducer frame supporting same and with the shaft removed therefrom.

FIG. 5 is a partial cutaway, side elevational view of a bearing block as mounted in a support hole in a chain reducer frame supporting the bearing block.

FIG. 6 is a view taken along 6—6 of the bearing block shown in FIG. 4.

DESCRIPTION

Figure 1:
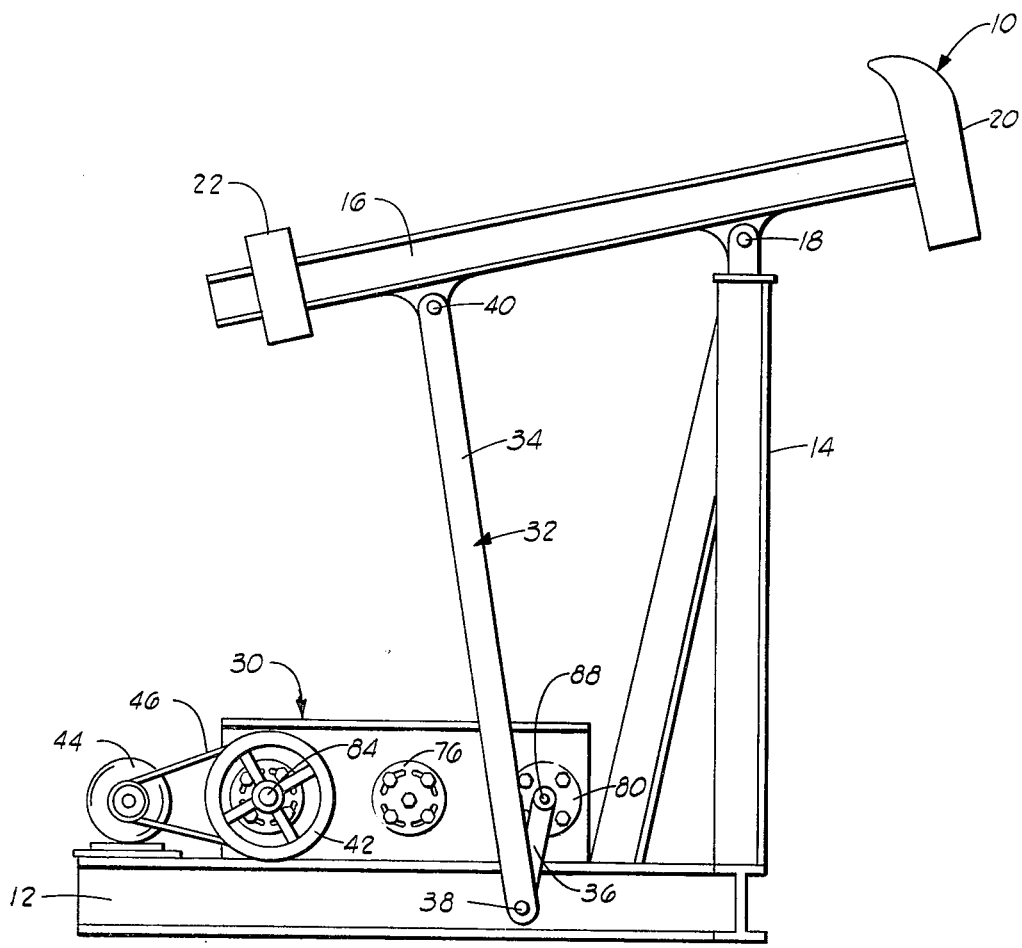
FIG. 1 is a semi-detail, side elevational view of an oil production pumping unit that incorporates the present invention.

Referring to the drawings in general, and particularly to FIG. 1, shown therein is an oil production pumping unit 10 that comprises a base 12, a generally vertically extending support structure 14 and a walking beam member 16 that is pivotally connected to the structure 14 at a pivot post 18. The walking beam 16 has a weighted rod connector 20, sometimes referred to as a horse's head, at one end, and a slidable counter weight 22 near the other end.

The pumping unit 10 also comprises a chain speed reducer assembly 30 constructed in accordance with the present invention and supported on the base 12. A rotating crank assembly 32 is connected to the output shaft of the chain speed reducer assembly 30, the crank assembly 32 having a pair of crank arms 34 and 36 that are joined together via a pivot point 38 and connected to the walking beam 16 at the pivot point 40. As the output shaft of the chain speed reducer assembly 30 is caused to turn, the crank arm 36, which is connected thereto, rotates and alternately pushes and pulls the crank arm 34 to alternately lift and lower the attached end of the walking beam 16, which in turn causes the horse's head 20 to move up and down. Not shown in FIG. 1 is a rod strand that is connected to the horse's head 20 and serves to stroke the submerged fluid pump that is disposed in the oil well.

The pumping unit 10 also comprises a drive pulley 42 that is connected to the input shaft of the chain speed reducer assembly 30, electric motor power source 44, and a drive belt 46 that connects the motor sheave to the drive pulley 42.

Figure 2:
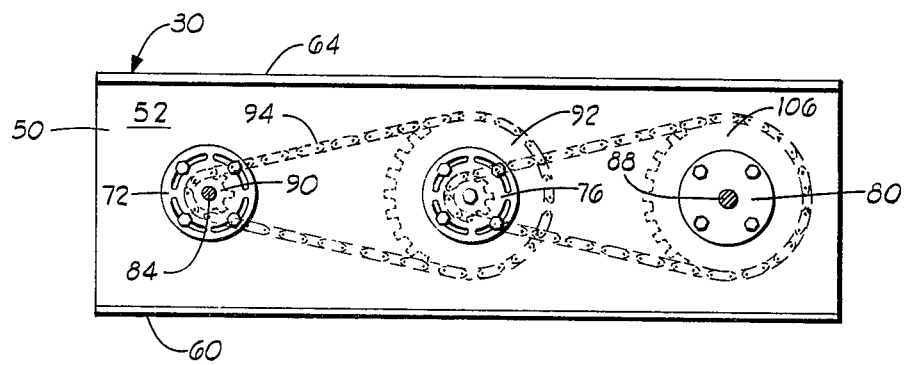
FIG. 2 is a side elevational view of the chain speed reducer assembly of the present invention.

Turning to FIG. 2, shown therein is an enlarged side view of the chain speed reducer assembly 30 with the pulley 42 and the crank assembly 32 removed therefrom; in FIG. 3, there is shown an enlarged top plan view of the chain speed reducer assembly 30 also having its top panel removed to disclose the internally disposed mechanisms thereof. The chain speed reducer assembly 30 comprises a chain reducer frame 50 that has a pair of opposing side walls 52 and 54; a pair of opposing end walls 56 and 58; and a bottom panel 60, all of which are interconnected to form the frame 50 having an internal cavity 62. The chain reducer frame 50 also has a top panel 64 that bolts to the top edges of the walls 52, 54, 56 and 58 via bolts and flanges (not shown) to seal the cavity 62 which is usually filled with a lubricating medium during normal operation.

The chain reducer frame 50 has a first pair of support holes 66, a second pair of support holes 68 and a third pair of support holes 70 disposed in the opposing side walls 52 and 54. The support holes of each pair are positioned in opposite walls and are axially aligned for a reason that will become clear below. A plurality of bearing blocks, which will be described fully below, are supported in the support holes 66, 68 and 70, with a first bearing block 72 and a second bearing block 74 supported in one each of the first pair of support holes 66; a third bearing block 76 and a fourth bearing block 78 supported in one each of the second pair of support holes 68; and a fifth bearing block 80 and a sixth bearing block 82 supported in one each of the third pair of support holes 70.

The first and second bearing blocks 72, 74 serve as a driver shaft support for a driver shaft 84; the third and fourth bearing blocks 76, 78 serve as a first driven shaft support for a first driven shaft 86; and the fifth and sixth bearing blocks 80, 82 serve as a second driven shaft support for a second driven shaft 88. A driver sprocket 90 is supported by the driver shaft 84 and is aligned with a first driven sprocket 92 attached to the first driven shaft 86. An endless roller chain 94 serves as a drive chain to connect the driver sprocket 90 and the driven sprocket 92.

Attached to the first driven shaft 86 are three driver sprockets 96, 98 and 100; and attached to the second driven shaft 88 are the corresponding driven sprockets 102, 104 and 106. Drive chains 108, 110 and 112 connect, respectively, the sprockets 96 and 102; the sprockets 98 and 104; and the sprockets 100 and 106. The size, and consequently the reducing ratios, of practical units will be discussed below.

Each of the shafts 84, 86 and 88 is supported by a pair of bearing blocks as discussed above. These bearing blocks, with the exceptions noted below, are similar in construction and are represented by the bearing block 76 that is shown in FIGS. 4 and 5. In FIG. 4, the bearing block 76 is shown as viewed from within the cavity 62, and in FIG. 5, a side elevational view of the bearing block 76 is shown in a partial cutaway of the support hole 66 in the side wall 54.

The bearing block 76 is supported by the chain reducer frame 50 and has a first end 113 and a second end 115, the second end 115 being a cylindrically shaped support portion. A flange portion 114 extends peripherally from the support portion of the bearing block 76 at the first end 110. The flange portion 114 has a plurality of peripheral slots 116 that extend through the flange to receive a plurality of bolts 118 that extend through appropriately disposed apertures in the side wall 54 to secure the bearing block 76 in a selected, fixed angular disposition. That is, the support hole 68 is shaped to receive the cylindrical portion of the second end 115 of the bearing block 76, the bearing block 76 being rotatable in the support hole 68 about the central axis 120 thereof. The peripheral slots 116, when the bolts 118 are loosened, permit the selective rotation of the bearing block 76 to a selected angular disposition, and this position is retained by simply tightening the bolts 118 to secure the bearing block 76 tightly to the chain reducer frame 50.

The bearing block 76 has a shaft supporting bore 122, viewable in the cross-sectional view of FIG. 6, that extends into the cylindrically shaped support portion of the second end 115 from the second end of the bearing block 76. The central axis of the shaft supporting bore 122 is axially displaced a predetermined offset distance represented by the arrow line 124 from the central axis 120 of the cylindrically shaped support portion of the second end 115. That is, with the shaft supporting bore 122 being offset from the central axis of the cylindrically shaped portion of the second end 115, the support portion which is supported by the chain reducer frame 50 serves as an eccentric support portion for one end of the shaft 86 so that selective rotation of the support portion of the bearing block 76 about its central axis 120 causes the axis of the shaft supporting bore 122 to rotate at a fixed offset distance 124 about the central axis 120.

As shown in FIG. 6, a bearing 126 is pressed into the shaft supporting bore 122 and serves to support an end portion of the shaft 86. Also viewable in FIG. 6 is a threaded aperture 128 that extends from the first end 113 to communicate with the shaft supporting bore 122, and a bolt 130 is shown in the aperture 128 to seal the aperture. The aperture 128, together with a bolt (not shown) of sufficient length to extend greater than the length of the aperture 128, serves as a shaft removal means for pushing the supported end of the shaft 86 out of the bearing 126 when it is desired to remove the shaft 86. In normal service, the bolt 130 will remain in place in the aperture 128, and as shown in FIG. 6, the length of the threaded end of the bolt 130 is predetermined such as to clear the supported end of the shaft 86 (which is not shown in FIG. 6).

As shown in FIGS. 5 and 6, a sealing ring 132 is supported in a groove that extends about the cylindrical supporting portion of the bearing block 76 and serves as a seal between the bearing block 76 and the support hole 68. Preferably, the seal ring 132 is a compressible, pliant O-ring.

Referring to FIG. 3, it will be noted that the bearing block 78 is identical in construction to the described bearing block 76. However, the drive shaft 84 extends through the first and second bearing blocks 72, 74, and the driven shaft 88 extends through the fifth and sixth bearing blocks 80, 82. While a representative cross-sectional view of the shaft supporting bores of the first and second bearing blocks 72, 74 is not shown, it will be sufficient to simply refer to FIG. 6 wherein the outline of a bore 128A is depicted in broken lines, representing the structure of the bearing blocks 72 and 74. The bore 128A which communicates with the bore 122, is larger than the aperture 128 and is not threaded, the size of the bore 128A being sufficient to accommodate the passage of the shaft end portion extending therethrough. With this exception (that is, the unthreaded and larger bore 128A instead of the aperture 128, and absent the bolt 130), the remaining structure of each of the bearing blocks 72, 74 is identical to that described for the bearing block 78.

The structure of the fifth and sixth bearing blocks 80, 82 is similar to that just described for the first and second bearing blocks 72, 74, and in fact, the structure of the bearing blocks 80, 82 is identical thereto with but one exception. Since the position of the fifth and sixth bearing blocks 80, 82 remains stationary once mounted to the chain reducer frame 50, the supporting bores 122 of these bearing blocks need not be eccentric to their central axes, so the bores 122 and 128A of the fifth and sixth bearing blocks 80, 82 are centered. Otherwise, the construction of the fifth and sixth bearing blocks 80, 82 is identical to the first and second bearing blocks 72, 74.

Operation

In the operation of the chain speed reducer 30, the power source 44 rotates the drive pulley 42, which is attached to the extending end of the drive shaft 84, via the drive belt 46. A typical sprocket arrangement found in a speed reducer for an oil well pumping unit is for there to be a reducing ratio of about 5.454 to 1.0 between the first driven sprocket 92 and the drive sprocket 90; and a reducing ratio of about 5.454 to 1.0 between the second drive sprockets 102, 104, 106 and the driver sprockets 96, 98 and 100. This achieves an overall reducing ratio of about 29.75 to 1.0 for a typical chain speed reducer constructed like the chain speed reducer 30 which has been described in detail hereinabove. Accordingly, the drive pulley 42, driven by the power source 44, will be sized to provide an input of about 600 r.p.m., effecting a rotational speed of the second drive shaft of 20 r.p.m. Consequently, the walking beam 16 will be oscillated at a rate of 20 cycles per minute, causing the connecting rod attached thereto to stroke the submerged fluid pump at 20 strokes per minute.

In the operation described above, the chain speed reducer assembly 30 achieves the same power transmission function of previously known speed reducers. It is during construction and continued operation that the adjustment features of the present invention will be appreciated. In common manufacturing experience, it is often the case that sprockets will vary within manufacturing tolerances such that the required lengths of the drive chains cannot be precisely predicted for each speed reducer assembly constructed. The chain speed reducer assembly 30 described herein is a double reduction reducer, utilizing three shafts 84, 86 and 88. Each of these shafts has one or more single strand sprockets, depending upon the output torque that is transmitted between shafts. When more than one chain is needed per shaft, such as is shown for the shafts 86, 88, the present invention utilizes single strand chains, instead of utilizing multiple chains, for the purpose of providing individual adjustment for each of the chains.

By loosening the bolts 118 in both the first and second bearing blocks 72, 74, the distance from the first driven shaft 86 can be varied horizontally by rotating the first and second bearing blocks 72, 74 together. Once the proper tensioning of the roller chain 94 is achieved, the drive shaft 84 can be canted within a few degrees by tightening the bolts 118 of one of the bearing blocks 72, 74, and rotating the other one of the bearing blocks 72, 74 to cant the driver shaft 84 to the degree necessary to align the sprockets 90 and 92. The bearings 126 are of the type that permit the center support portion to vary a few degrees from true centering relative to the outer race of the bearing. This feature permits true rotation of the drive shaft 84 even though the drive shaft 84 is somewhat canted.

While the second driven shaft 88 is established in its stationary position by the bolts that attach the fifth and sixth bearing blocks 80, 82 to the chain reducer frame 50, the first driven shaft 86 can be canted in like manner to that just described for the shaft 84 by varying the angular disposition of the third and fourth bearing blocks 76, 78. Thus, the selected relative canting of the shafts 84 and 86 permit each of the chains 94, 108, 110 and 112 to be adjusted to optimum tensioning when the chain speed reducer assembly 30 is initially assembled.

With continued operation of the chain speed reducer assembly 30, it is common for the chains and sprockets to wear at varying rates. As a consequence one or several of these chains may become tensioned less than the optimum tensioning desired; that is, while the amount of tensioning in each of the chains is usually not critical, it is important that the chains be retained in a condition in which the tensioning is approximately equal in all of the chains. When any of the chains 94, 108, 110 or 112 is loosened during the operation of the chain speed reducer 30, it is a simple matter to adjust the chains to achieve optimum tension once again in each of the chains by simply readjusting the chains in the manner described above for initial assembly.

It is clear that the present invention is well adapted to carry out the objects and attain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the appended claims.

What is claimed is:

1. In a drive chain apparatus having a frame, a driver shaft rotatably supported by the frame, and a driver sprocket supported by the driver shaft, the driver shaft having a first end and a second end, and the frame having a first pair of axial aligned support holes, a second pair of axially aligned support holes, and a third pair of axially aligned support holes, the improvement comprising:

a first bearing block supportable by the frame, the first bearing block having a cylindrically shaped support portion and a flange portion extending peripherally from the support portion at a first end thereof, the first bearing block having a shaft supporting bore extending through the support portion from a second end thereof, the shaft supporting bore being axially displaced a predetermined offset distance from the central axis of the support portion of the first bearing block, the support portion of the first bearing block having a groove positioned thereon such that the groove is disposed in one of the first pair of axially aligned support holes in the frame when the first bearing block is positioned therein, the flange portion of the first bearing block having plural peripheral slots for receiving bolts extending therethrough so that the flange portion of the first bearing block can be bolted to the frame and secured thereto in a selected angular disposition when the cylindrically shaped portion of the first bearing block is disposed in one of the first pair of axially aligned support holes in the frame;

first bearing means supported in the shaft supporting bore of the first bearing block;

a second bearing block supportable by the frame, the second bearing block having a cylindrically shaped support portion and a flange portion extending peripherally from the support portion from a first end thereof, the second bearing block having a shaft supporting bore extending through the support portion from a second end portion thereof, the shaft supporting bore being axially displaced a predetermined offset distance from the central axis of the support portion of the second bearing block, the support portion of the second bearing block having a groove positioned thereon such that the groove is disposed in the other of the first pair of axially aligned support holes in the frame when the second bearing block is positioned therein the flange portion of the second bearing block having plural peripheral slots for receiving bolts extending therethrough so that the flange portion of the second bearing block can be bolted to the frame and secured thereto in a selected angular disposition when the cylindrically shaped portion of the second bearing block is disposed in the other of the first pair of axially aligned support holes in the frame;

second bearing means supported in the shaft supporting bore of the second bearing block, the first and second bearing means cooperating with the first and second bearing blocks such that a portion of the first end of the driver shaft is supportable by the first bearing means and extends from the first end of the first bearing block and a portion of the second end of the driver shaft is supported by the second bearing means and extends from the first end of the second bearing block;

first seal means supported by each of the first and second bearing blocks for sealing between the support portions of the first and second bearing blocks and the frame;

a third support bearing block supportable by the frame, the third support bearing block having a cylindrically shaped support portion and a flange portion extending peripherally from the support portion at a first end thereof, the third bearing block having a shaft supporting bore extending into the support portion of the third bearing block from a second end thereof, the shaft supporting bore being axially displaced a predetermined offset distance from the central axis of the support portion of the third bearing block, the support portion of the third bearing block having a groove positioned thereon such that the groove is disposed in one of the second pair of axially aligned holes in the frame when the third bearing block is positioned therein, the flange portion having plural peripheral slots therein for receiving bolts extending therethrough so that the flange portion of the third bearing block can be bolted to the frame and secured thereto in a selected angular disposition when the cylindrically shaped portion of the third bearing block is disposed in one of the second pair of axially aligned support holes in the frame, the third bearing block further characterized as having a threaded aperture communicating from the first end thereof to the shaft supporting bore;

third bearing means supported in the supporting bore of the third bearing block;

fourth bearing block supportable by the frame, the fourth bearing block having a cylindrically shaped support portion and a flange portion extending peripherally from the support portion of the fourth bearing block at a first end thereof, the fourth bearing block having a shaft supporting bore extending into the support portion of the fourth bearing block from a second end thereof, the shaft supporting bore being axially displaced a predetermined offset distance from the central axis of the support portion of the fourth bearing block, the support portion of the fourth bearing block having a groove positioned thereon such that the groove is disposed in the other of the second pair of the axially aligned holes in the frame when the fourth bearing block is positioned therein, the flange portion of the fourth bearing block having plural peripheral slots for receiving bolts extending therethrough so that the flange portion of the fourth bearing block can be bolted to the frame and secured thereto in a selected angular disposition when the cylindrically shaped portion of the fourth bearing block is disposed in the other of the second pair of axially aligned support holes in the frame;

fourth bearing means supported in the shaft supporting bore of the fourth bearing block;

second seal means supported by each of the third and fourth bearing blocks for sealing between the support portions of the third and fourth bearing block and the frame;

a first driven shaft having a first end portion and a second end portion, the first end portion supported by the third bearing means and the second end portion supported by the fourth bearing means;

shaft removal means for alternatively sealing the threaded aperture of the third support bearing block and for pressing against the first end portion of the first driven shaft when removing same from the third bearing means and thus the third support block;

a driven sprocket supported by the first driven shaft;

a drive chain connecting the driver sprocket supported by the driver shaft and the driven sprocket supported by the first driven shaft;

a plurality of driver sprockets supported by the first driven shaft;

a fifth bearing block supportable by the frame, the fifth bearing block having a cylindrically shaped support portion and a flange portion extending peripherally from the support portion of the fifth bearing block at a first end thereof, the fifth bearing block having a centrally disposed shaft supporting bore extending through the support portion of the fifth bearing block from a second end thereof, the support portion of the fifth bearing block having a groove positioned thereon such that the groove is disposed in one of the third pair of the axially aligned holes in the frame when the fifth bearing block is positioned therein, the flange portion of the fifth bearing block having plural peripheral holes for receiving bolts extending therethrough so that the flange portion of the fifth bearing block can be bolted to the frame and secured thereto;

fifth bearing means supported in the shaft supporting bore of the fifth block;

a sixth bearing block supportable by the frame, the sixth bearing block having a cylindrically shaped support portion and a flange portion extending peripherally from the support portion of the sixth bearing block at a first end thereof, the sixth bearing block having a centrally disposed shaft supporting bore extending through the support portion of the sixth bearing block from a second end thereof, the support portion of the sixth bearing block having a groove positioned thereon such that the groove is disposed in the other of the third pair of the axially aligned holes in the frame, the flange portion of the sixth bearing block having plural peripheral holes for receiving bolts extending therethrough so that the flange portion of the sixth bearing block can be bolted to the frame and secured thereto;

third seal means supported by each of the fifth and sixth bearing blocks for sealing between the support portions of the fifth and sixth bearing blocks and the frame;

a second driven shaft having a first end portion and a second end portion, the first end portion being supportable by the fifth bearing means and the second end portion being supportable by the sixth bearing means;

a plurality of driven sprockets supported by the second driven shaft, the plurality of driven sprockets being disposed so that one of each of the driven sprockets is aligned with one of the driver sprockets supported by the first driven shaft; and a plurality of drive chains connecting the driven sprockets supported by the second driven shaft and the driver sprockets supported by the first driven shaft.

2. The improvement of claim 1 wherein the first, second and third seal means comprise a compressible pliant sealing ring.

3. A chain speed reducer assembly for an oil producing unit comprising:

a chain reducer frame having a first pair of axially aligned support holes, a second pair of axially aligned support holes, and a third pair of axially aligned support holes;

a first bearing block having a support portion and supported by the chain reducer frame so that upon positioning the support portion of the first bearing block in one of the first pair of axially aligned support holes the support portion is selectively rotatable about a central axis thereof, the support portion of the first bearing block having an eccentric shaft support bore axially displaced from the central axis a predetermined offset distance;

first attaching means for securing the first bearing block to the chain reducer frame at a selected angular disposition;

first bearing means supported in the shaft supporting bore of the first bearing block;

a second bearing block having a support portion and supported by the chain reducer frame so that upon positioning the support portion of the second bearing block in the other of the first pair of axially aligned support holes the support portion of the second bearing block is selectively rotatable about a central axis thereof, the support portion of the second bearing block having an eccentric shaft support bore axially displaced from the central axis a predetermined offset distance;

second attaching means for securing the second bearing block to the chain reducer frame at a selected angular disposition;

second bearing means supported in the shaft supporting bore of the second bearing block;

a driver shaft having a first end portion rotatably supported by the first bearing means and a second end portion rotatably supported by the second bearing means;

at least one driver sprocket supported by the driver shaft;

first seal means supported by each of the first and second bearing blocks for sealing between the support portions of the first and second bearing blocks and the chain reducer frame;

a third bearing block having a support portion and supported by the chain reducer frame so that upon positioning the support portion of the third bearing block in one of the second pair of axially aligned support holes the support portion is selectively rotatable about a central axis thereof, the support portion of the third bearing block having an eccentric shaft support bore axially displaced from the central axis a predetermined offset distance, the third bearing block further characterized as having a threaded aperture communicating from the first end thereof to the shaft support bore;

third attaching means for securing the third bearing block to the chain reducer frame at a selected angular disposition;

third bearing means supported in the shaft support bore of the third bearing block;

a fourth bearing block having a support portion and supported by the chain reducer frame so that upon positioning the support portion of the fourth bearing block in the other of the second pair of axially aligned support holes the support portion is selectively rotatable about a central axis thereof, the support portion of the fourth bearing block having an eccentric shaft support bore axially displaced from the central axis a predetermined offset distance;

fourth attaching means for securing the fourth bearing block to the chain reducer frame at a selected angular disposition;

fourth bearing means supported in the shaft support bore of the fourth bearing block;

second seal means supported by each of the third and fourth bearing blocks for sealing between the support portions of the third and fourth bearing blocks and the chain reducer frame;

a first driven shaft having a first end portion rotatably supported by the third bearing means and a second end portion rotatably supported by the fourth bearing means;

at least one driven sprocket supported by the first driven shaft;

at least one drive chain connecting the driver sprocket supported by the driver shaft and the driven sprocket supported by the first driven shaft;

a plurality of driver sprockets supported by the first driven shaft;

a fifth bearing block having a support portion and supported by the chain reducer frame so that upon positioning the support portion of the fifth bearing block in one of the third pair of axially aligned support holes the support portion is selectively rotatable about a central axis thereof, the support portion of the fifth bearing block having a centrally disposed shaft support bore;

fifth attaching means for securing the fifth bearing block to the chain reducer frame;

fifth bearing means supported in the shaft support bore of the fifth bearing block;

a sixth bearing block having a support portion and supported by the chain reducer frame so that upon positioning the support portion of the sixth bearing block in the other of the third pair of axially aligned support holes the support portion is selectively rotatable about a central axis thereof, the support portion of the sixth bearing block having a centrally disposed shaft support bore;

sixth attaching means for securing the sixth bearing block to the chain reducer frame;

sixth bearing means supported in the shaft support bore of the sixth bearing block;

third seal means supported by each of the fifth and sixth bearing blocks for sealing between the support portions of the fifth and sixth bearing blocks and the chain reducer frame;

a second driven shaft having a first end portion rotatably supported by the fifth bearing means and a second end portion rotatably supported by the sixth bearing means;

a plurality of driven sprockets supported by the second driven shaft, the plurality of driven sprockets being disposed so that one of each of the driven sprockets supported by the second driven shaft is aligned with one of the driver sprockets supported by the first driven shaft; and a plurality of drive chains connecting the driven sprockets supported by the second driven shaft and the driver sprockets supported by the first driven shaft.

4. The chain reducer assembly of claim 3 wherein each of the bearing blocks is provided with a flange portion extending peripherally about one end of each cylindrical support portion, the flange portion of the first, second, third and fourth bearing blocks each have plural peripheral slots, and wherein each of the first, second, third and fourth attaching means comprises bolt connectors extending through the peripheral slots in the flange portion of the first, second, third and fourth bearing blocks so that the bolt connectors can secure the first, second, third and fourth bearing blocks to the chain reducer frame in a selected angular disposition.

5. The chain reducer assembly of claim 4 wherein the flange portion of the fifth and sixth bearing blocks are each provided with plural peripheral holes, and wherein the fifth and sixth attaching means comprises bolt connectors extending through the peripheral holes of the flange portions of the fifth and sixth bearing blocks so that the flange portion of the fifth and sixth bearing blocks can be bolted to the chain reducer frame and secured thereto.

6. The chain reducer assembly of claim 5 wherein the support portion of each of the bearing blocks has a groove positioned thereon so that the groove is disposed in the respective hole of the chain reducer frame when the bearing block is positioned therein.

7. The chain reducer assembly of claim 6 wherein the first, second and third seal means comprises a compressible pliant sealing ring disposed one each in the groove of each of the bearing blocks, and wherein three driver sprockets are supported by the first driven shaft, three driven sprockets are supported by the second driven shaft, three driver chains innerconnect one each of the driver sprockets supported by the first driven shaft and the driven sprockets supported by the second driven shaft.

8. The chain reducer assembly of claim 7 wherein the chain reducer frame comprises a pair of opposing side walls, a pair of opposing end walls, a bottom panel, and a top panel, the opposing side walls, the opposing end walls, and the bottom panel being interconnected to provide the frame with an internal cavity for holding a lubricating medium, one of the side walls containing one of the first, second and third axially aligned support holes, the opposed side wall containing one of the first, second, and third axially aligned support hole.

9. The chain reducer assembly of claim 8 wherein the first end of the driver shaft supported by the first bearing means extends a distance from one side wall of the chain reducer frame, the second end portion of the first driver shaft extending a distance from the other of the side walls of the frame assembly, the first end portion of the second driven shaft extends a distance from one side wall of the chain reducer frame,, and the second end portion of the second driven shaft extends a distance from the other of the side walls of the chain reducer frame.

10. The chain reducer assembly of claim 9 which further comprises shaft removal means for alternatively sealing the threaded aperture of the third support bearing block and for pressing against the first end portion of the first driven shaft when removing same from the third bearing means and thus the third support block.

* * * * *